Nov. 4, 1952 — V. THOMPSON — 2,616,360
BARBECUE RACK
Filed Feb. 24, 1949 — 2 SHEETS—SHEET 1
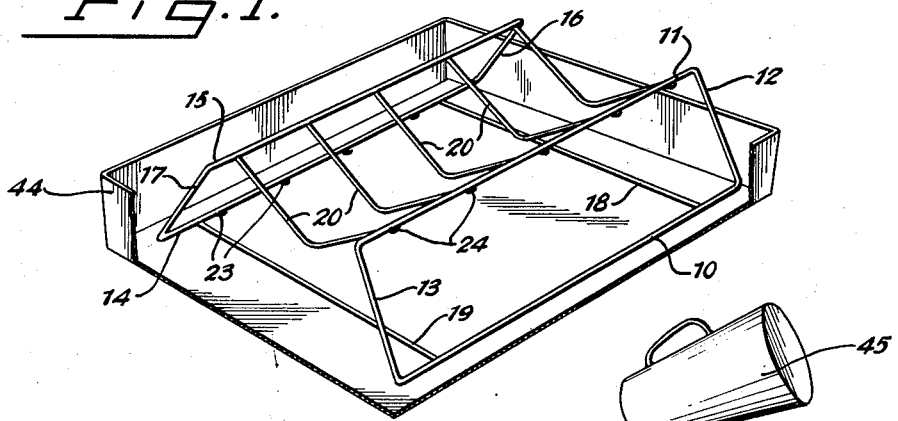
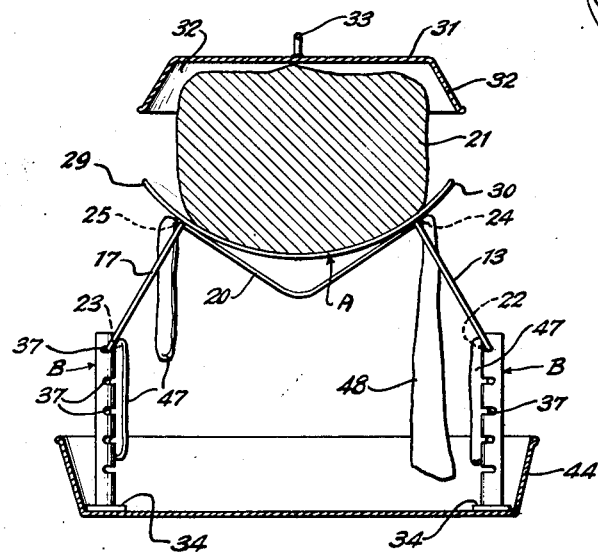
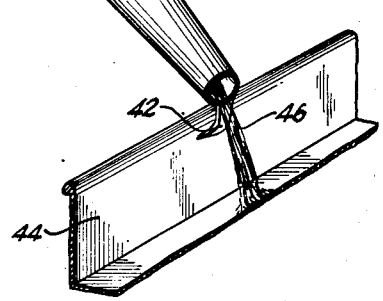
Inventor
VIOLA THOMPSON.
By John A. Mawhinney
ATTORNEY Nov. 4, 1952 — V. THOMPSON — 2,616,360
BARBECUE RACK
Filed Feb. 24, 1949 — 2 SHEETS—SHEET 2
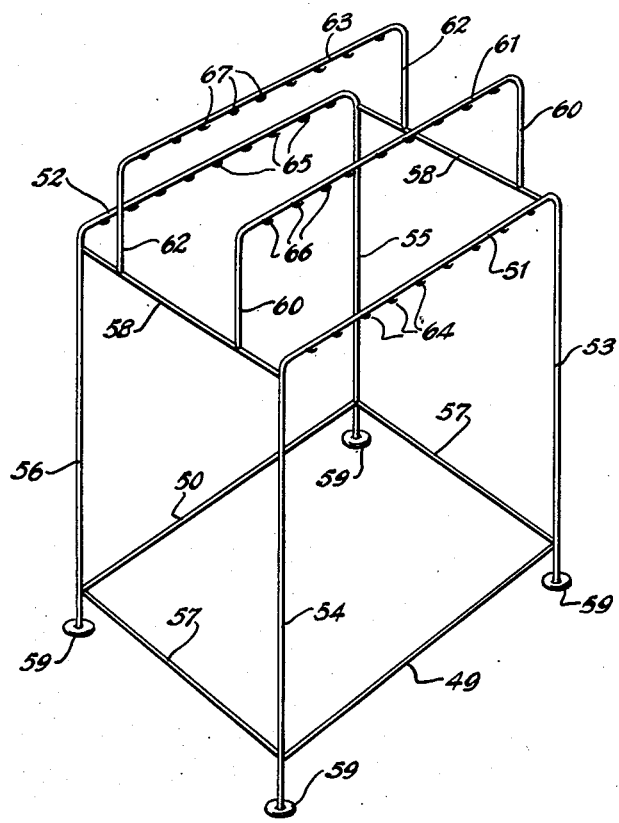
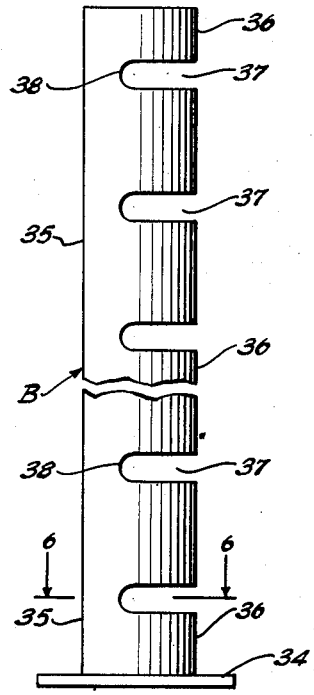
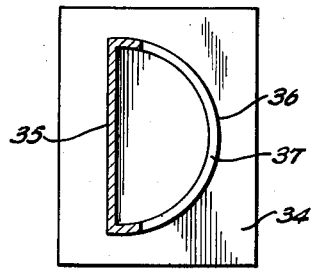
Inventor
VIOLA THOMPSON.
By John A. MacKinney
ATTORNEY Patented Nov. 4, 1952

2,616,360

UNITED STATES PATENT OFFICE 2,616,360

BARBECUE RACK

Viola Thompson, Washington, D. C.

Application February 24, 1949, Serial No. 78,161

5 Claims. (Cl. 99—426)

This invention relates to improvements in a barbecue rack and has for an object to provide a rack by which meats and the like can be barbecued indoors in the conventional domestic oven.

Another object of the present invention is to provide an improved structure of this character in which the meat supporting member can be raised and lowered whereby the meat or the like can be moved closer to or away from the source of heat.

A further object of the present invention is to provide an improved rack in which a removable tray supports the meat to be barbecued so that when it is desired to remove the meat from the oven this can be accomplished by removing the tray and meat as a unit.

A still further object of the present invention is to provide an improved device of this character in which a combined hook and funnel is provided for engaging a pan in which the rack is disposed and for introducing water or the like into the pan.

The present invention aims to provide a plurality of hooks on the rack from which frankfurters, fish, or the like may be suspended so that they may be barbecued or roasted.

With the foregoing and other objects in view, the invention will be hereinafter more fully described and more particularly pointed out in the appended claims.

In the drawings, in which the same parts are denoted by the same reference numerals throughout the several views, Figure 1 is a perspective view of the improved rack constructed in accordance with the present invention and shown disposed in a pan, a portion of which is broken away, Figure 2 is an end elevational view of the improved rack in one of its operative positions and with parts in section, Figure 3 is a perspective view of the combined hook and funnel illustrated in operative relation to a pan, a part of which is shown, Figure 4 is a top plan view of the removable tray, Figure 5 is an enlarged fragmentary side elevational view of one of the supporting legs, Figure 6 is a transverse sectional view taken on the line 6—6 of Figure 5, and Figure 7 is a perspective view of a modified form of the invention.

Referring more particularly to the drawings and especially to Figures 1 to 5, inclusive, 10 indicates a base member, 11 an upper member and 12 and 13 end members of a substantially rectangular frame. This frame can be made from any suitable material which is light in weight and possesses the necessary strength and rigidity. The base 10 and the members 11, 12 and 13 are bars and can be formed integral with one another and are round in cross section. A second frame which is similar in construction to the first frame has a base member 14, an upper member 15 and end members 16 and 17.

As shown in Figures 1 and 2 of the drawings, the two frames are disposed at an angle of the order of sixty degrees to each other and are maintained in this angular relation by braces 18 and 19, the opposite ends of which are secured to the base members 10 and 14 as by welding or the like. Supporting rods 20 have their opposite ends secured to the upper members 11 and 15 as by welding or the like. These rods 20 are V-shaped, as can be seen from Figures 1 and 2, and perform the dual function of supporting a piece of meat or the like 21 and assist in maintaining the two frames in their angularly disposed position.

The base members 10 and 14 have secured to their inner faces a series of spaced apart inwardly and upwardly extending hooks 22 and 23, respectively. The upper members 11 and 15 have secured to their outer faces a series of similarly constructed and arranged hooks 24 and 25, respectively. These hooks are adapted to receive frankfurters, fish, chickens, or the like which are to be barbecued or roasted. The hooks 22 and 24 are arranged in longitudinally staggered relationship and the hooks 23 and 25 are likewise arranged so that a greater number of articles to be cooked can be accommodated and also suspend such articles to prevent overlapping and contact therebetween.

A removable tray, generally indicated at A, comprises a substantially oval shaped frame 26 of wire or the like, longitudinally extending bars 27, the opposite ends of which are secured to the frame 26 as by welding or the like and transversely extending braces 28, the opposite ends of which are secured to the frame 26. The bars 27 are slighly dished and are supported by the braces 28 to which they are secured by welding or the like. As shown in Figure 2, the tray A is supported by the rods 20 and the upper members 11 and 15 and has oppositely extending hand grips 29 and 30. These grips 29 and 30 extend outwardly beyond the frames and the meat 21 so that they are readily accessible for being grasped by the hands of the operator for removing the meat from the rack. A cover 31 having downwardly and outwardly inclined sides 32 is placed over the upper portion of the meat 21. The cover 31 has a suitable handle 33.

For the purpose of supporting the rack and the meat thereon at selected distances from the source of heat, supporting legs generally indicated at B are provided. One of these legs is shown in Figure 5 and comprises a base or foot 34 which is substantially rectangular in shape so as to afford a firm support for the leg. The foot 34 has mounted thereon a vertically disposed standard having a rear wall 35 and a forward semi-circular shaped wall 36. The forward wall has a series of vertically spaced apart horizontally extending recesses or slots 37, the inner closed ends of which are rounded, as indicated at 38.

A combined hook and funnel member 41 has a tapering cylindrical main body portion with a hook 42 secured to its smaller end and extending outwardly and downwardly therefrom. The larger end of the member 41 has a cut-away front portion to provide a lip 43.

In the use of the device the improved rack is placed in a roasting pan 44 of the conventional type as shown in Figure 1. The base members 10 and 14 and the braces 18 and 19 rest upon the bottom of the pan 44 to properly support the rack therein. The removable tray A is then placed upon the rack and the meat 21 is disposed upon the tray A. The tray A due to its dished shape will accommodate the lower surface of the meat as illustrated in Figure 2 in which it is shown as being supported by the rods 20 and the upper members 11 and 15. The lid 31 is then placed upon the top portion of the meat and the pan 44, together with the rack and the meat, are placed within the oven. During the cooking operation the juices emanating from the sides and bottom portions of the meat, due to the open work nature of the tray A, will drip into the pan 44. These collected juices under the influence of the heat in the oven will form a vapor which will ascend and permeate the meat so that the meat will be kept moist. Some of these vapors will pass upwardly around the sides of the meat and the inclined sides 32 of the cover 31 will direct these portions of the vapors against the under surface of the cover 31 from which they will be directed into the upper portion of the meat to augment the moistening thereof.

If the amount of the collected juices in the pan 44 becomes depleted or too low, water or flavoring fluid can be added without withdrawing the pan and the meat from the oven by the use of the combined hook and funnel member 41. The oven door can be opened and the hook 42 engaged with the inner face of the proximate end of the pan 44 and the part of the rear wall of the body portion 41 adjacent the hook will rest upon the upper edge of the pan so that the member 41 will assume the proper inclination for conducting the fluid into the pan. A pitcher 45 can be employed for introducing water or flavoring fluid 46 into the member 41. As the fluid 46 leaves the pitcher 45 it will fall upon the lip 43 of the member 41 and be guided thereby into the tapered cylindrical portion of the member 41 and thence into the pan 44. The provision of this member 41 will not only save the time and efforts of the housewife but will also prevent the meat from cooling off due to being withdrawn from the oven to replenish the fluid in the pan. In the event, however, that it becomes necessary or desirable to withdraw the meat for inspection or the like, the member 41 with its hook 42 engaging the pan can be used to pull the pan 44 from the oven and the flat end of the member 41 adjacent the hook 42 can be placed against the outer face of the pan to push it into the oven again.

When it is desired to move the meat away from the source of heat, one of the legs B can be placed in the pan 44 adjacent each corner thereof with the open portions of the recesses 37 of the legs on one side of the pan facing the open portions of the recesses of the legs on the opposite side of the pan. The base members 10 and 14 of the rack are then inserted in the selected recesses 37 depending upon the height at which it is desired to raise the meat. The round bars 10 and 14 will seat in the round portions 38 of the recesses.

After the meat has been properly barbecued and it is desired to remove it from the rack the operator grasps the hand grips 29 and 30 of the removable tray A and lifts it and the meat from the rack.

When the rack is elevated on its legs B, as shown in Figure 2, frankfurters 47 can be suspended from the hooks 22, 23 and 25 and a chicken or the like 48 can be placed upon one or more of the hooks 24. The frankfurters and the chickens can be barbecued separately or at the same time as the meat 21.

Referring to the form of the invention illustrated in Figure 7, 49 and 50 indicate base members and 51 and 52 upper members of the rack. The members 49 and 51 are connected by end members 53 and 54 and the members 50 and 52 are connected by end members 55 and 56. The members 49, 51, 53 and 54 constitute a substantially rectangular frame and the members 50, 52, 55 and 56 comprise a similarly constructed frame. The two frames are connected in upright position by lower braces 57 and upper braces 58. The end members 53, 54, 55 and 56 extend downwardly below the base members and are provided with supporting feet 59.

An inverted U-shaped bracket comprises vertically extending legs 60 and a bar 61 connecting the legs 60. The lower free end portions of the legs 60 are secured as by welding or the like to the upper faces of the upper braces 58 at points inwardly from the adjacent ends thereof. A similarly constructed inverted U-shaped bracket comprises vertically extending legs 62 and a connecting bar 63. The lower free end portions of the legs 62 are secured as by welding or like to the upper faces of the upper braces 58 at points spaced inwardly from their adjacent ends.

A series of longitudinally spaced apart hooks 64 are secured to the outer face of the upper member 51 and a similar series of hooks 65 are mounted upon the inner face of the upper member 52. The outer face of bar 61 has a series of spaced apart hooks 66 secured thereto and the inner face of the bar 63 has a series of hooks 67 attached thereto. The hooks 64 and 66 are arranged in longitudinally staggered relation and the hooks 65 and 67 are similarly arranged.

In the use of the form of the invention illustrated in Figure 7, the rack can be placed in a conventional roasting pan, such as the pan 44, and frankfurters, fish, chickens or the like can be attached to the hooks. The pan and rack can then be placed in the oven and the juices of the articles being barbecued will be collected in the pan and the steam or vapor from these juices will permeate the articles being cooked to keep them moistened and savory. The improved rack can be hung from suitable hooks or the like when not in use since they are of open-work construction.

This device can be used to barbecue any food from an oyster or a meat loaf to a large turkey or a small pig. It is also believed that this method of cooking would lessen the calorie count considerably which is in many cases very important. When cooked properly in this device no food will be hard, tough, or dry, but will be much juicier than with other methods and devices heretofore known. This barbecue rack fits into any type of pan.

It is obvious that various changes and modifications may be made in the details of construction and design of the above specifically described embodiment of this invention without departing from the spirit thereof, such changes and modifications being restricted only by the scope of the following claims:

What I claim is:

1. An improved barbecue rack comprising a pair of frames, each having a base member, an upper member, and a pair of end members joining said base member and said upper member, a plurality of hooks mounted on the upper member of each frame, upper and lower braces joining said frames, a bracket supported by said upper braces and extending upwardly therefrom above the upper members of said frames, and hooks mounted upon said bracket.

2. An improved barbecue rack comprising a pair of frames, each having a base member, an upper member, and a pair of end members joining said base member and said upper member, a plurality of hooks mounted on the upper member of each frame, upper and lower braces joining said frames, a pair of inverted U-shaped brackets each having spaced apart vertically extending legs and a bar connecting said legs, the lower free end portions of the legs of each bracket being secured to the upper braces at points inwardly of the ends of said upper braces, hooks secured to the bars of each bracket, the hooks on the brackets and the frames being longitudinally disposed in staggered relationship.

3. An improved barbecue rack comprising a pair of frames, meat supporting rods connecting said frames, and legs for supporting said frames at a predetermined height from the source of heat and each comprising a supporting foot and a vertically extending standard having a rear wall and a forward semi-circular shaped wall provided with a series of vertically spaced apart recesses.

4. An improved barbecue rack comprising a pair of frames, substantially V-shaped connecting elements for connecting said frames, and a meat supporting tray removably positioned on said elements and comprising a substantially oval shaped frame having sides dished in a longitudinal direction, longitudinally extending bars dished in a longitudinal direction to conform to the V-shaped connecting elements and having their opposite ends secured to the ends of said tray frame, and transversely extending braces having their opposite ends secured to the sides of said tray frame and secured to said longitudinal bars, the ends of said tray frame forming hand grips.

5. An improved barbecue rack comprising a pair of frames positioned in spaced apart relation, means for maintaining said frames in spaced apart relation, and two horizontally extending rows of hooks carried by each frame, one row of hooks of each frame being horizontally and vertically spaced from the other row of hooks of each frame so that articles to be barbecued of one length may be supported by one row of hooks and other articles to be barbecued of a different length may be supported by the other row of hooks in proper spaced relation to a source of heat, the hooks of one row of each frame being longitudinally staggered with respect to the other row of hooks of each frame.

VIOLA THOMPSON.

REFERENCES CITED

The following references are of record in the file of this patent:

UNITED STATES PATENTS

| Number | Name | Date |
| --- | --- | --- |
| 248,698 | Branch | Oct. 25, 1881 |
| 311,662 | Knight | Feb. 3, 1885 |
| 361,742 | Bennett | Apr. 26, 1887 |
| 363,519 | Houston | May 24, 1887 |
| 539,857 | Conklin | May 28, 1895 |
| 728,067 | Young | May 12, 1903 |
| 1,061,431 | West | May 13, 1913 |
| 1,309,049 | Syrett | July 8, 1919 |
| 1,969,601 | Foch | Aug. 7, 1934 |
| 2,052,505 | Vetrosky | Aug. 25, 1936 |
| 2,080,171 | Fairbanks et al. | May 11, 1937 |
| 2,205,064 | Irwin | June 18, 1940 |
| 2,348,507 | Wells | May 9, 1944 |
| 2,376,640 | Wall et al. | May 22, 1945 |
| 2,421,922 | Bocchino | June 10, 1947 |
| 2,469,698 | Morgan | May 10, 1949 |

FOREIGN PATENTS

| Number | Country | Date |
| --- | --- | --- |
| 12,970 | Great Britain | Oct. 12, 1886 |
| 335,727 | Great Britain | Oct. 2, 1930 |